United States Patent
He et al.

(10) Patent No.: US 10,795,456 B2
(45) Date of Patent: Oct. 6, 2020

(54) METHOD, DEVICE AND TERMINAL FOR DETERMINING EFFECTIVENESS OF STRIPE SET

(71) Applicant: Guangdong Virtual Reality Technology Co., Ltd., Shenzhen, Guangdong Province (CN)

(72) Inventors: Jie He, Shenzhen (CN); Jingwen Dai, Shenzhen (CN); Congling Wan, Shenzhen (CN); Yongtao Hu, Shenzhen (CN)

(73) Assignee: GUANGDONG VIRTUAL REALITY TECHNOLOGY CO., LTD., Shenzhen, Guangdong Province (CN)

(*) Notice: Subject to any disclaimer, the term of this patent is extended or adjusted under 35 U.S.C. 154(b) by 161 days.

(21) Appl. No.: 15/578,705

(22) PCT Filed: Mar. 22, 2016

(86) PCT No.: PCT/CN2016/076980
§ 371 (c)(1),
(2) Date: Nov. 30, 2017

(87) PCT Pub. No.: WO2017/161496
PCT Pub. Date: Sep. 28, 2017

(65) Prior Publication Data
US 2018/0173327 A1    Jun. 21, 2018

(51) Int. Cl.
*G06F 3/0346* (2013.01)
*G06F 3/03* (2006.01)
(Continued)

(52) U.S. Cl.
CPC .......... *G06F 3/0346* (2013.01); *G06F 3/017* (2013.01); *G06F 3/0325* (2013.01);
(Continued)

(58) Field of Classification Search
CPC ...... G06F 3/0346; G06F 3/0325; G06F 3/017; G06T 7/0002; G06T 7/70;
(Continued)

(56) References Cited

U.S. PATENT DOCUMENTS

2013/0026945 A1* 1/2013 Ganick ................. H05B 45/10
315/246
2016/0227153 A1* 8/2016 Ryan .................... H04N 5/2351

FOREIGN PATENT DOCUMENTS

CN    102426480 A      4/2012
CN    102779279 A  *  11/2012
(Continued)

*Primary Examiner* — Richard A Hansell, Jr.
(74) *Attorney, Agent, or Firm* — Cheng-Ju Chiang

(57) ABSTRACT

The present application provides a method and device for searching stripe set and a system with the same. Wherein, the method includes: a plurality of first connected domains are obtained in the binary image. A target connected domain is selected from the plurality of first connected domains. The stripe set based on the target connected domain is determined to determine a stripe pattern. A center of the stripe pattern is calculated according to the target connected domain of the stripe set. Whether the stripe set is an effective stripe set is determined based on the center of the stripe pattern. The method can eliminate the impact of incomplete stripe pattern on the image and improve the accuracy of recognition.

20 Claims, 7 Drawing Sheets

(51) Int. Cl.
*G06F 3/01* (2006.01)
*G06T 7/00* (2017.01)
*G06T 7/70* (2017.01)
*H04N 5/353* (2011.01)

(52) U.S. Cl.
CPC .............. *G06T 7/0002* (2013.01); *G06T 7/70* (2017.01); *H04N 5/3532* (2013.01); *G06T 2207/10152* (2013.01); *G06T 2207/30168* (2013.01); *G06T 2207/30208* (2013.01)

(58) Field of Classification Search
CPC . G06T 2207/30208; G06T 2207/30168; G06T 2207/10152; H04N 5/3532
See application file for complete search history.

(56) References Cited

FOREIGN PATENT DOCUMENTS

| | | | |
|---|---|---|---|
| CN | 102779279 A | | 11/2012 |
| CN | 103886552 A | * | 6/2014 |
| CN | 104282011 A | | 1/2015 |
| JP | 2002-286411 A | | 10/2002 |

* cited by examiner

METHOD, DEVICE AND TERMINAL FOR DETERMINING EFFECTIVENESS OF STRIPE SET

CROSS REFERENCE TO RELATED APPLICATIONS

The present application is a 35 U.S.C. § 371 National Phase conversion of International (PCT) Patent Application No. PCT/CN2016/076980, filed on Mar. 22, 2016, the disclosure of which is incorporated by reference herein. The PCT International Patent Application was filed and published in Chinese.

TECHNIQUE FIELD

The present disclosure relates to an image processing technology, and more particularly, to a method and device for searching stripe set and a system with the same.

BACKGROUND

With the development of human-machine interaction technology, using gesture swing and other moving objects to replace a direct contact with a computer device, to enter the instruction, has become a development trend. Therefore, how to track human gestures or a state of moving objects becomes a problem need to be solved. A motion tracking system can image the light spot of flashing light sources on the moving object to track the moving object.

However, in actual applications, if a flashing light source on the moving objects reaches edges of the rolling shutter image sensor, a stripe pattern formed by the flashing light source may be incomplete in the raw image. The incomplete raw image will cause interference to the image recognition.

SUMMARY

In a first aspect, the present disclosure provides a method for determining effectiveness of a stripe set, includes: obtaining a plurality of first connected domains in a binary image; selecting a target connected domain from the plurality of first connected domains; determining the stripe set based on the target connected domain, to determine a stripe pattern; calculating a center of the stripe pattern based on the target connected domain of the stripe set; determining whether the stripe set is an effective stripe set based on the center of the stripe pattern.

In connection with the first aspect, in the first possible embodiment of the first aspect, before the obtaining the plurality of first connected domains in the binary image, the method further includes: receiving a raw image in one frame captured by a rolling shutter image sensor, wherein the raw image includes the stripe pattern formed by a flashing light source; binarizing the raw image based on a binarization threshold to obtain the binary image.

In connection with the first aspect, in the second possible embodiment of the first aspect, the selecting the target connected domain from the plurality of first connected domains includes: determining a width of each first connected domain; comparing each width with a preset width; determining an eligible first connected domain as the target connected domain, based on the comparing result.

In connection with the second possible embodiment of the first aspect, in the third possible embodiment of the first aspect, the comparing each width with a preset width; determining an eligible first connected domain as the target connected domain, based on the comparing result includes: taking x-axis in the direction of extension of a preset stripe image and y-axis perpendicular to the x-axis, based on an imaging surface of the rolling shutter image sensor; traversing all pixels of the plurality of first connected domains to obtain a maximum column coordinate y1 and a minimum column coordinate y2 of each of the pixels in the plurality of first connected domains; determining the width of each first connected domain as follows: the maximum column coordinate y1 in the pixel minus the minimum column coordinate y2 in the pixel; judging whether the width of each first connected domain is met: $kh1 \leq w \leq kh2$, wherein $kh1$ is a preset first boundary condition parameter and $kh2$ is a preset second boundary condition parameter, wherein $w$ is the width of the first connected domain; determining the first connected domain whose width meets $kh1 \leq w \leq kh2$ as the target connected domain.

In connection with the third possible embodiment of the first aspect, the fourth possible embodiment of the first aspect further includes: deleting the first connected domain with the width not met: $kh1 \leq w \leq kh2$ from the plurality of first connected domains.

In connection with the first possible embodiment of the first aspect, in the fifth possible embodiment of the first aspect, after receiving the raw image in one frame obtained by a rolling shutter image sensor, and before selecting the target connected domain, the method further comprises: processing the raw image to obtain a stripe pattern template; and identifying the target connected domain based on the stripe pattern template, wherein a shape of the stripe pattern template is a patch formed by the stripe pattern in the raw image.

In connection with the first possible embodiment of the first aspect, in the sixth possible embodiment of the first aspect, after the receiving the raw image in one frame captured by a rolling shutter image sensor, and before selecting the target connected domain, the method further includes: processing the raw image to obtain a stripe pattern template; identifying the target connected domain based on the stripe pattern template, wherein the shape of the stripe pattern template is a patch formed by the stripe pattern in the raw image.

In connection with the sixth possible embodiment of the first aspect, in the seventh possible embodiment of the first aspect, the processing the raw image to obtain the stripe pattern template includes: filtering the raw image according to a filtering parameter to obtain a blurred image, wherein the filtering parameter is configured to merge the stripe pattern in the raw image into a patch; binarizing the blurred image to obtain a binary blurred image; searching a connected domain for the binary blurred image to obtain a plurality of second connected domains; identifying shapes of the plurality of second connected domains; defining the second connected domain closest to the stripe pattern formed by the predetermined flashing light source, as a stripe pattern template.

In connection with the seventh possible embodiment of the first aspect, in the eighth possible embodiment of the first aspect, the identifying the target connected domain based on the stripe pattern template includes: judging whether or not the coordinates of pixels of the first connected domain are included in a set of coordinates of the pixels in the stripe pattern template; if so, determining the first connected domain as the target connected domain.

In connection with the first aspect, in the ninth possible embodiment of the first aspect, the number of the target connected domain is multiple, the raw image includes a plurality of stripe patterns formed by a plurality of flashing light sources, the determining the stripe set based on the target connected domain includes: classifying the target connected domains to obtain a plurality of stripe sets.

In connection with the ninth possible embodiment of the first aspect, in the tenth possible embodiment of the first aspect, the classifying the target connected domains to obtain a plurality of stripe sets includes: determining an initial stripe set based on the condition that the target connected domain constitutes a stripe set, and selecting the target connected domain not classified into any initial stripe set; selecting the jth target connected domain from the target connected domain that is not classified as any initial stripe set, wherein j is a positive integer; drawing a circle with the center of mass of the jth target connected domain as the center and the length of the jth target connected domain as the diameter; judging whether any one of the target connected regions in the initial stripe set intersects the circle; if intersecting, classifying the jth target connected region into the corresponding initial stripe set to obtain the stripe set.

In connection with the tenth possible embodiment of the first aspect, in the eleventh possible embodiment of the first aspect, after the classifying the target connected domains to obtain a plurality of stripe sets further includes: judging whether the stripe set satisfies the following conditions: a number of target connected domains in the set stripe set is greater than a number threshold; and a length of a longest target connected domain of the stripe set is greater than the length threshold; if one of the conditions is not satisfied, deleting the stripe set.

In combination with the eleventh possible embodiment of the first aspect, in the twelfth possible embodiment of the first aspect, the calculating the center of the stripe pattern based on the target connected domain of the stripe set includes: calculating an average of the coordinate values of the centers of the target connected domains of the stripe set to obtain the coordinate value of the center of the stripe pattern.

In combination with the twelfth possible embodiment of the first aspect, in the thirteenth possible embodiment of the first aspect, the calculating the average of the coordinate values of the centers of the target connected domains of the stripe set, to obtain the coordinate value of the center of the stripe pattern includes: calculating an average of the coordinate values of the centers of the target connected domains of the stripe set according to the formula (1) to obtain the center $(u_0, v_0)$ of the stripe pattern:

$$(u_0, v_0) = \left( \frac{\sum_{i=1}^{L_i} \left( u_{min}^j + \frac{W_i}{2} \right)}{L_i}, \frac{\sum_{i=1}^{L_i} \left( v_{min}^i + \frac{H_i}{2} \right)}{L_i} \right) \quad (1)$$

wherein i is the sequence number of the target connected domain of the stripe set, $L_i$ is the number of target connected domains of the stripe set, $u_{min}^i$ is the minimum abscissa of the ith target connected domain, $v_{min}^i$ is the minimum ordinate of the ith target connected domain, $W_i$ is the width of the ith target connected domain, and $H_i$ is the length of the ith target connected domain.

In combination with the thirteenth possible embodiment, in the fourteenth possible embodiment of the first aspect, after the calculating the average of the coordinate values of the centers of the target connected domains of the stripe set, and before the determining whether the stripe set is an effective stripe set based on the center of the stripe pattern, the method further includes: filtering the pixel values of the pixels in the rectangular region Q to obtain the filtered pixel values, wherein the center of the rectangular region Q is the center $(u_0, v_0)$ of the stripe pattern, and the width of the rectangular region Q is the width of the maximum connected area in the stripe set; recalculating coordinate values of the center $(u_0, v_0)$ of the stripe pattern, with the pixel value of the filtered pixel as the weight.

In connection with the fourteenth possible embodiment of the first aspect, in the fifteenth possible embodiment of the first aspect, the filtering the pixel values of the pixels in the rectangular region Q to obtain the filtered pixel values includes: filtering the pixel values of the pixels in the rectangular region Q by filter template according to the formula (2) to obtain the filtered pixel values $Gray_{u_j,v_j}$, $$Gray_{u_j,v_j} = \frac{\sum_{x=-\frac{n-1}{2}}^{\frac{n-1}{2}} \sum_{y=-\frac{n-1}{2}}^{\frac{n-1}{2}} \begin{cases} grav_{(u_{j+x},v_{j+y})} > kvalue & grav_{(u_{j+x},v_{j+y})} \\ grav_{(u_{j+x},v_{j+y})} \le kvalue & 0 \end{cases}}{n*n} \quad (2)$$

Wherein n is the number of rows and columns of the filter template, $grav_{(u_{j+x},v_{j+y})}$ is the pixel value, and kvalue is the binarization threshold.

In connection with the fourteenth possible embodiment of the first aspect, in the sixteenth possible embodiment of the first aspect, wherein recalculating the coordinate value of the center $(u_0, v_0)$ of the stripe pattern with the pixel value of the filtered pixel as the weight includes:

recalculating a coordinate value of the center $(u_0, v_0)$ of the stripe pattern according to the formula (3), $$(u_0, v_0) = \frac{\sum_Q Gray_{u_j,v_j}(u_j, v_j)}{\sum_Q Gray_{u_j,v_j}} \quad (3)$$

Wherein, $(u_j, v_j)$ is the coordinate value of the pixel in the rectangular region Q, and $Gray_{u_j,v_j}$ is the pixel value after the pixel $(u_j, v_j)$ being filtered.

In combination with the thirteenth possible embodiment of the first aspect, in the seventeenth embodiment possible embodiment of the first aspect, the determining whether the stripe set is an effective stripe set based on the center of the stripe pattern includes: judging whether the center $(u_0, v_0)$ of the stripe pattern satisfies at least one of the following:

$$\begin{cases} u_0 - \frac{R}{2} < 0 \\ u_0 + \frac{R}{2} > kwide - 1 \\ v_0 - \frac{R}{2} < 0 \\ v_0 + \frac{R}{2} > kheight - 1 \end{cases}$$

Wherein R is the maximum width of the connected domain of the stripe set, kwide is i the width of the binary image, kheights the height of the binary image; if at least one is satisfied, determining that the stripe set is an ineffective stripe set; if no one is satisfied, determining that the stripe set is an effective stripe set.

In a second aspect, the present disclosure provides a terminal. The terminal includes a rolling shutter image sensor, a memory, and a processor coupled to the rolling shutter image sensor and the memory, respectively. Wherein the memory is configured to store images captured by the rolling shutter image sensor and instructions. The processor is configured to execute the instructions. When the processor executes the instructions, a method is performed for determining effectiveness of a stripe set, the method includes: obtaining a plurality of first connected domains in a binary image; selecting a target connected domain from the plurality of first connected domains; determining the stripe set based on the target connected domain, to determine a stripe pattern; calculating a center of the stripe pattern based on the target connected domain of the stripe set; determining whether the stripe set is an effective stripe set based on the center of the stripe pattern.

In a third aspect, the present disclosure provides an image processing device. The image processing device includes a memory, and a processor coupled to the rolling shutter image sensor and the memory, respectively. Wherein the memory is configured to store images obtained by a rolling shutter image sensor and instructions; the processor is configured to execute the instructions. When the processor executing the instructions, a method is performed for determining effectiveness of a stripe set, the method includes: obtaining a plurality of first connected domains in a binary image; selecting a target connected domain from the plurality of first connected domains; determining the stripe set based on the target connected domain, to determine a stripe pattern; calculating a center of the stripe pattern based on the target connected domain of the stripe set; determining whether the stripe set is an effective stripe set based on the center of the stripe pattern.

DETAILED DESCRIPTION OF PREFERRED EMBODIMENTS

Figure 1:
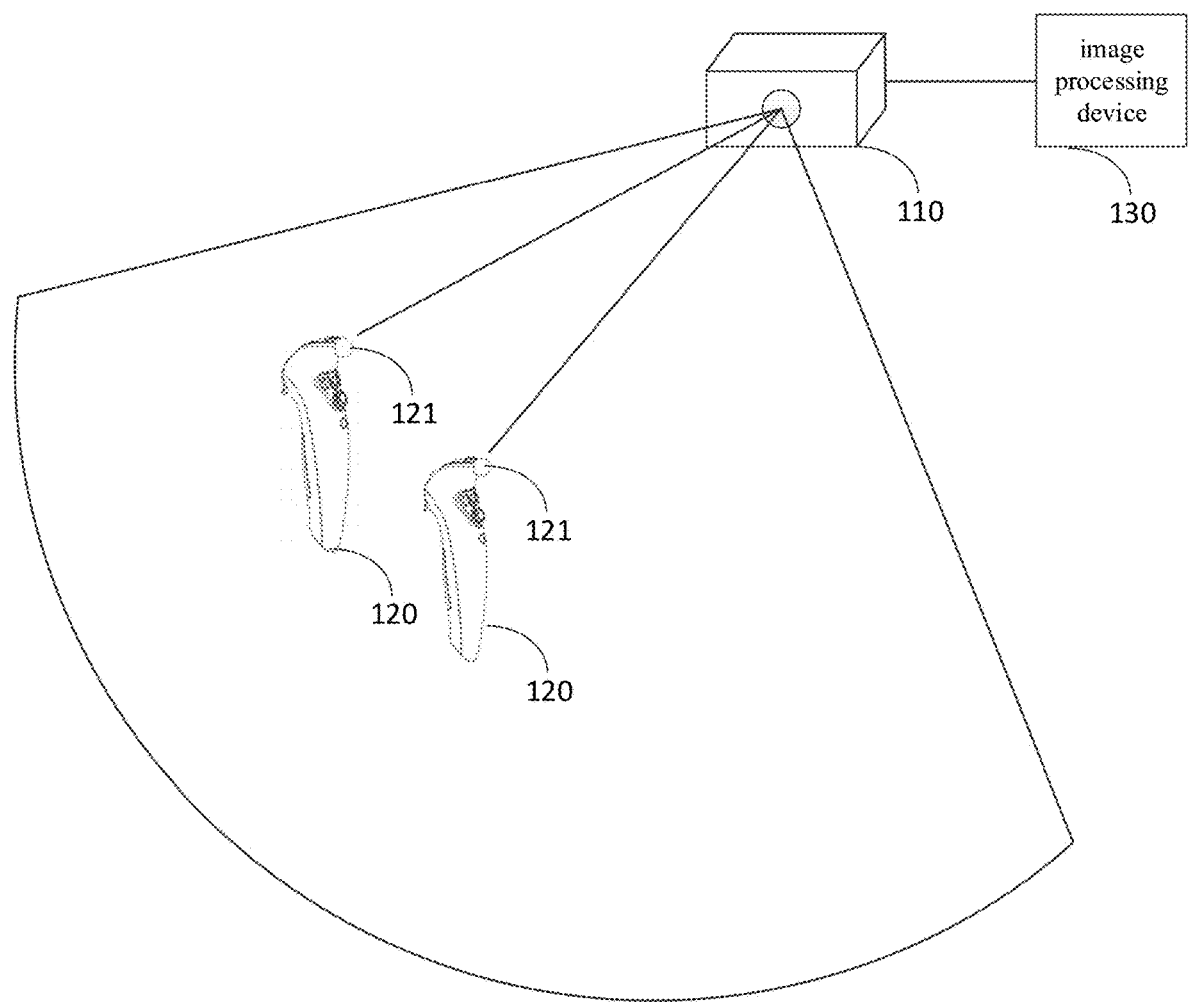
FIG. 1 illustrates a schematic diagram of a motion tracking system, according to embodiments of the present disclosure.
Figure 2:
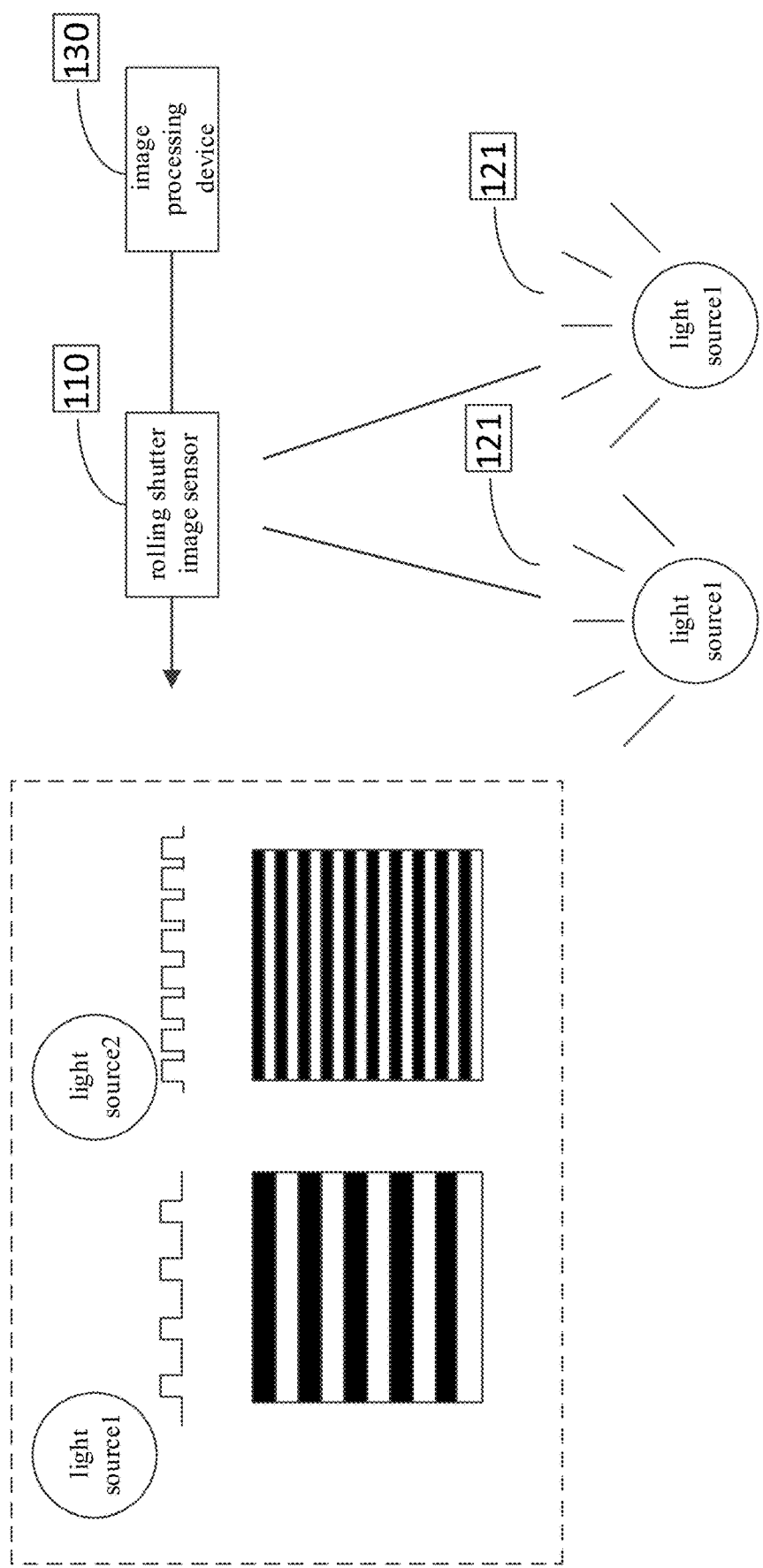
FIG. 2 illustrates a schematic diagram of a stripe pattern of a flashing light source captured by a rolling shutter image sensor in a motion tracking system, according to embodiments of the present disclosure.

As illustrated in FIG. 1 and FIG. 2, an embodiment of the present disclosure provides a motion tracking system. The motion tracking system may include a rolling shutter image sensor 110, a controller 120 provided with a flashing light source 121, and an image processing device 130.

The rolling shutter image sensor 110 is an image sensor with a rolling shutter function. For example, a CMOS (Complementary Metal Oxide Semiconductor) sensor provided with an electronic rolling shutter and a CCD (Charge Coupling Element) sensor provided with a Rolling shutter. The rolling shutter image sensor 110 may be provided on the image processing device or may be provided on a separate third-party device. The rolling shutter image sensor 110 may scan in a line or a column with an image sensor with a rolling shutter function.

The controller 120 may be a game controller, a pointing stick, a somatosensory mouse, and the like. The controller 120 is provided with a flashing light source. The number of the controller 120 can be one or more. The number of flashing light source on each controller may be one or more. The flashing light source may be a light source having a relatively stable flashing frequency or a changing flashing frequency, for example, an LED or the like. By controlling the duty cycle of the power input to the LED, it is possible to control the LED to flashing at a fixed frequency or a non-fixed frequency. Wherein the flashing frequency of the flashing light source is greater than the scanning frequency of the rolling shutter image sensor.

The image processing device 130 may be an entity having a good computing power such as an embedded processor, a digital image processor, a smart phone, a computer, a tablet computer, a notebook, and the like. The image processing device 130 may be provided with a rolling shutter image sensor or may not be provided.

The rolling shutter image sensor 110 of the embodiment is an image sensor with a rolling shutter function. The rolling shutter image sensor 110 is configured to capture a raw image of the flashing light source on the controller 120. The flashing light source is a light source having a relatively stable flashing frequency or a changing flashing frequency. The flashing light source can make the rolling shutter image sensor 110 form a raw image including a pattern of alternating dark/white stripes in the horizontal direction thereof. Specifically, if the flashing light source is "on", when the rolling shutter image sensor 110 scans the flashing light source, a white stripe corresponding to the flashing light source appears in the raw image. If the flashing light source is "off", when the rolling shutter image sensor 110 scans the flashing light source, and a dark stripe corresponding to the flashing light source appears in the raw image. The flashing frequency of the flashing light source is greater than the scanning frequency of the rolling shutter image sensor 110. Correspondingly, after the scanning of the flashing light source is completed, a pattern of alternating dark/white stripes appears in the raw image.

Figure 3:
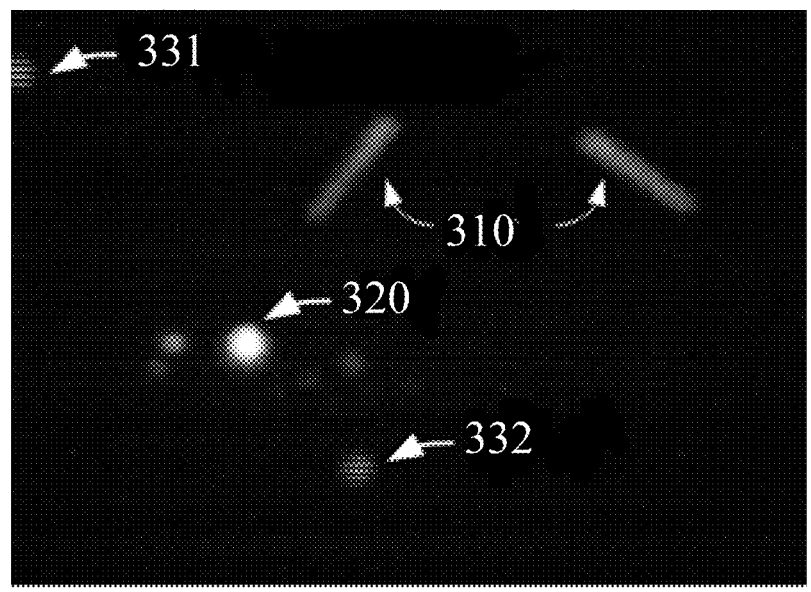
FIG. 3 illustrates a raw image captured by a rolling shutter image sensor in a motion tracking system in an actual working condition, according to embodiments of the present disclosure.

As illustrated in FIG. 3, due to the influence of the actual imaging environment, after exposure, unavoidably, light spots formed by fluorescent lamps 310 or incandescent lamps 320 in the environment may exist in the raw image, in addition to the pattern formed by the flashing light source 331 or 332. Therefore, after the raw image being captured by the rolling shutter image sensor 110, the rolling shutter image sensor 110 sends the raw image to the image processing device. The processing device may process the raw image to exclude the influence of light spots formed by the fluorescent lamp 310 and the incandescent lamp 320. The stripe patterns formed by the flashing light source 331 or 332 are recognized from the raw image.

In general, the stripe patterns in the raw image may include a pattern of alternating dark/white stripes formed by the exposure of the flashing light source 331 and a pattern of alternating dark/white stripes formed by the exposure of the flashing light source 332. For easy description and understanding, white stripes will be used to as an example in the following description.

The shape of the outline of the stripe pattern in the raw image is related to the shape of the flashing light source 331 or 332. For example, if the shape of the flashing light source 331 or 332 is circular, the stripe pattern may include a plurality of white stripes in different lengths, and the outline of the stripe pattern is circular. If the shape of the flashing light source 331 or 332 is rectangular, the stripe pattern may include a plurality of white stripes in same length, and the outline of the stripe pattern is rectangular. The width of the white stripe in the stripe pattern is related to the flashing period of the flashing light source 331 or 332, for example, the longer flashing period of the flashing light source 331 or 332 may produce the wider width of the white stripe. Under extreme conditions, if the flashing period of the flashing light source 331 or 332 is infinite, the flashing light source 331 or 332 will form an all-bright spot on the raw image without stripes. The number of the stripe patterns in the raw image and the number of the flashing light sources 331 and 332 in field of the rolling shutter image sensor 110 are in one-to-one correspondence. For example, if the number of the flashing light sources in the field of the rolling shutter image sensor 110 is two, the number of the stripe patterns in the raw image is two.

Figure 4:
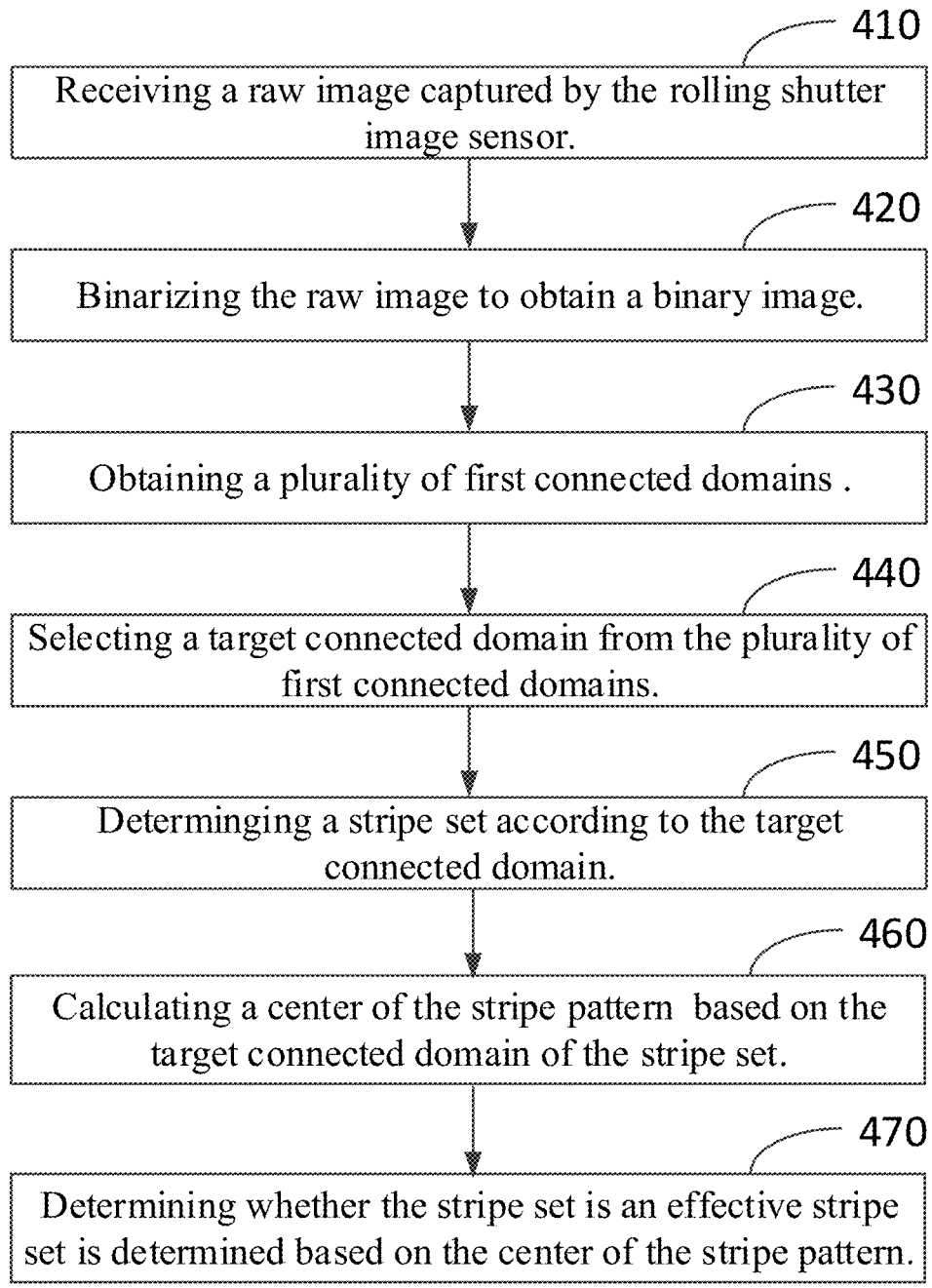
FIG. 4 illustrates a flow chart of a method for determining the effectiveness of a stripe set provided by an embodiment of the present invention, according to embodiments of the present disclosure.

FIG. 4 is a flow chart of a method for determining the effectiveness of a stripe pattern provided by an embodiment of the present invention, according to embodiments of the present disclosure. The method may include the following steps.

In step 410, receiving a raw image captured by the rolling shutter image sensor. Wherein the raw image includes at least one stripe pattern formed by at least one flashing light source. In addition, the raw image captured by the rolling shutter image sensor in one frame. The raw image in one frame may be an image which is captured by the rolling shutter image sensor and contains one or more stripe patterns formed by one or more flashing light sources. The width of the stripes of the stripe pattern may be different.

In step 420, binarizing the raw image to obtain a binary image.

In step 430, obtaining a plurality of first connected domains by searching a connected domain corresponding to pixels having a pixel value equal to a first threshold value in the binary image.

In step 440, selecting a plurality of target connected domains from the plurality of first connected domains, wherein the target connected domain is the connected domain formed by the stripe.

In step 450, determining a stripe set according to the target connected domains. Wherein the stripe set is the set of the target connected domains corresponding to the stripe pattern.

In step 460, calculating a center of the stripe pattern based on the target connected domain of the stripe set.

In step 470, determining whether the stripe set is an effective stripe set based on the center of the stripe pattern.

In some embodiments, since the rolling shutter image sensor may be provided on the image processing device or may be provided on a separate third-party device, the image processing device may directly obtain the raw image by exposing the flashing light source through the rolling shutter image sensor, or may indirectly receive the raw image transmitted by the third-party device, which is obtained by exposing the flashing light source.

In at least one alternative embodiment, after receiving the raw image captured by the rolling shutter image sensor, a binary image is obtained by binarizing the raw image. Specifically, the raw image can be binarized according to the following formula:

$$\begin{cases} P(i) = P_1, & P(i) > x; \\ P(i) = P_2, & P(i) \leq x. \end{cases}$$

Figure 5:
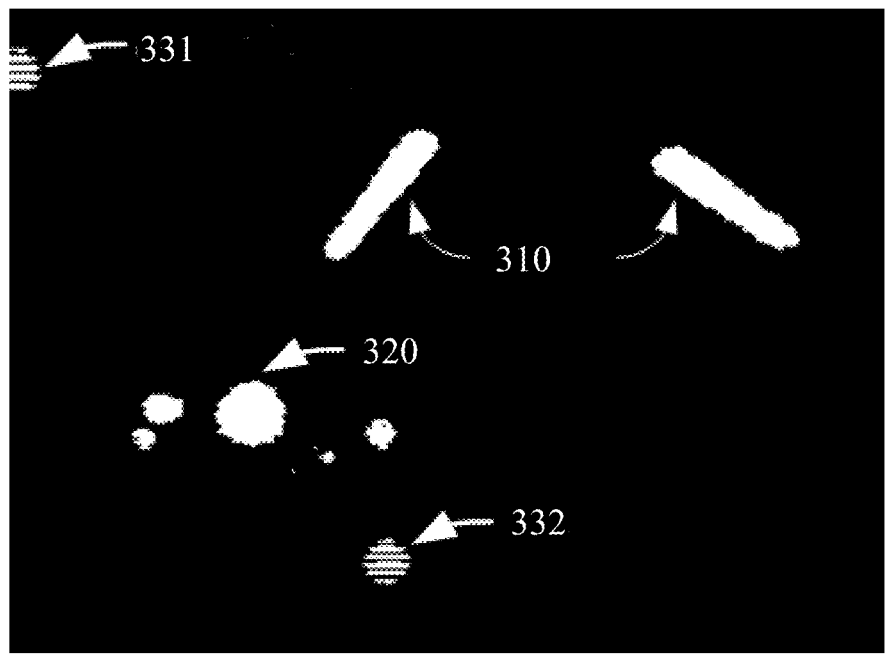
FIG. 5 illustrates an image obtained after the step 420 is performed in a method for determining the effectiveness of a stripe set, according to embodiments of the present disclosure.

Wherein, i is a sequence number of the pixel in the raw image, $P(i)$ is a pixel value of the pixel i in the raw image, x is a preset binarization threshold, $P_1$ is a preset first threshold value, $P_2$ is a preset second threshold value. The pixel value of the flashing light source is close to the pixel value of the incandescent lamp and the fluorescent lamp, and the pixel value of the flashing light source is much different from the pixel value of the background. Therefore, the binarization threshold x may be set in advance so that the pixel value of the stripe pattern formed by the flashing light source and the pixels corresponding to the light spot formed by the incandescent lamp and the fluorescent lamp or the like is larger than the binarization threshold x, and the pixel value of the background pixels is less than or equal to the binarization threshold x. For example, when the first threshold value is preset to "1", the second threshold value is preset to "0"; when the first threshold value is preset to "0", the second threshold value is preset to "1". As illustrated in FIG. 5, in the binary image obtained by binarization, the pixel value of the stripe pattern formed by the flashing light source and the pixels corresponding to the light spot formed by the incandescent lamp and the fluorescent lamp or the like is set to "1", the pixel value of the pixels corresponding to the background is set to "0".

In some embodiments, the manner of setting the binarization threshold may include a global threshold method, an adaptive threshold method, a local threshold method, and the like.

In an exemplary embodiment, the global threshold method may be implemented as follows: presetting a global threshold and using the preset global threshold as a binarization threshold for the raw images in all frames. For a specific frame of the raw image, all the pixels in the raw image are compared with the binarization threshold to obtain a binary image. Wherein, the global threshold may be manually set according to experience.

In an exemplary embodiment, the adaptive threshold method may be implemented as follows: determining a binarization threshold of the raw image in current frame based on information of the raw image in previous frames.

For the raw image in current frame, all the pixels in the raw image are compared with the binarization threshold to obtain a binary image.

In an exemplary embodiment, the local threshold method may be implemented as follows: scanning the image from top to bottom and from left to right, judging whether the pixel value of every pixel i is smaller than the preset threshold. If the pixel value of the pixel i is smaller than the preset threshold, it will not be processed temporarily. If the pixel value of the pixel i is greater than or equal to the preset threshold, the method may include calculating the average value or the Gaussian mean value of the pixel values in the N×N neighborhood of the current pixel i, and taking the calculated average value or Gaussian mean value as the binarization threshold of the current pixel i. Wherein N is a positive integer greater than 0. The pixel value of the pixel i is compared with the binarization threshold of the pixel i. If the pixel value of pixel i is greater than the binarization threshold of pixel i, the pixel value of pixel i is set to the first threshold value, and if the pixel value of pixel i is smaller than the binarization threshold the pixel value of pixel i is set to the second threshold value, thereby obtaining the binary image.

In some embodiments, after obtaining the binary image, a connected domain corresponding to pixels having a pixel value equal to the first threshold value is searched in the binary image, to obtain a plurality of first connected domains. Specifically, in the binary image, if the pixel A and the pixel B are 4 adjacent or 8 adjacent, the pixel A is connected to the pixel B. Wherein, the pixel I (x, y), the pixel I (x−1, y), the pixel I (x+1, y), the pixel I (x, y−1), and the pixel I (x, y+1) are 4 adjacent, the pixel I (x, y), the pixel I (x−1 y−1), the pixel I (x−1, y), the pixel I (x−1, y+1), the pixel I (x, y−1), the pixel I (x, y+1), the pixel (x+1,y−1), the pixel (x+1,y), and the pixel (x+1,y+1) are 8 adjacent. If the pixel A is connected to the pixel B, and the pixel B is connected to the pixel C, the pixels A, B, and C belong to a same connected domain. By using a two-pass method or a Seed-Filling method and other algorithms to find the connected domain, a plurality of first connected domain can be obtained. As illustrated in FIG. 5, in the first connected domain corresponding to the stripe patterns formed by the flashing light source 331 or 332, each stripe in the stripe patterns corresponds to a first connected domain. In the first connected domain corresponding to the light spot formed by the incandescent lamp 320, each light spot formed by an incandescent lamp 320 corresponds to a first connected domain. In the first connected domain corresponding to the light spot formed by the fluorescent lamp 310, each light spot formed by a fluorescent lamp 310 corresponds to a first connected domain.

In some embodiments, after obtaining the plurality of the first connected domains, the first connected domains corresponding to the stripe pattern formed by the flashing light source are selected from the plurality of first connected domains as the target connected domains. In particular, the target connected domains may be obtained in two ways.

Figure 6:
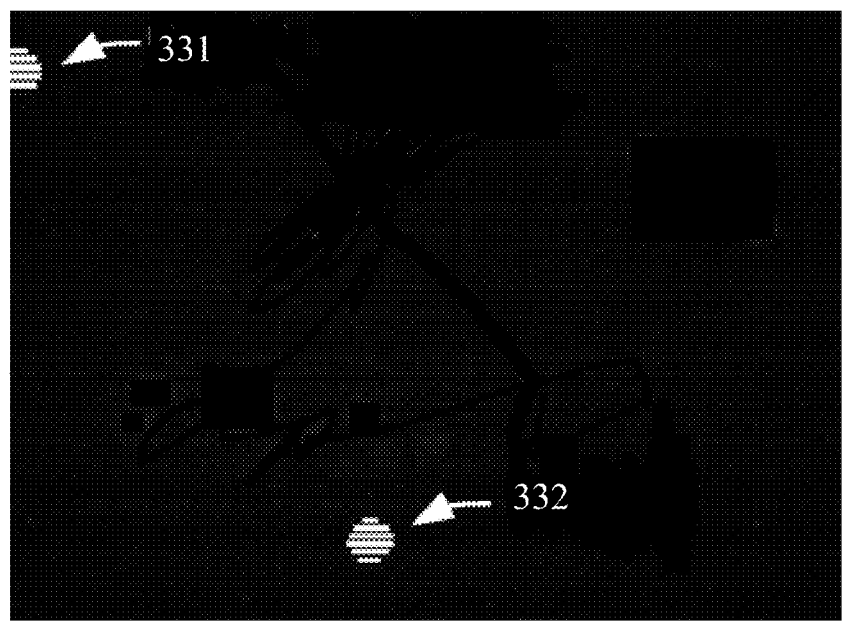
FIG. 6 illustrates an image obtained after the step 440 is performed in a method for determining the effectiveness of a stripe set, according to embodiments of the present disclosure.

In the first embodiment, determining a width of each of the first connected domains. The width of each first connected domains is compared with a preset width, and according to the comparison result, eligible first connected domains are determined as the target connected domains. Specifically, since the width of the first connected domain corresponding to the stripes in the stripe pattern formed by the flashing light source is much smaller than the width of the first connected domain corresponding to the light spot formed by the fluorescent lamp 310 and the incandescent lamp 320, and the width of the first connected domain corresponding to the stripes in the stripe pattern can not be too small, it is possible to determine whether the first connected domain is the target connected domain by the following method. First, according to the rolling shutter image sensor imaging plane, the direction of extension of the preset stripe image is taken as the x-axis, and the y-axis is taken perpendicular to the x-axis. All the pixels of the plurality of first connected domains are traversed to obtain a maximum column coordinate y1 and a minimum column coordinate y2 of all the pixels in the plurality of first connected domains, and determining the width of each first connected domain as follows: the maximum column coordinate y1 in the pixel minus the minimum column coordinate y2 in the pixel. Judging whether or not the width of each first connected domain is met: kh1≤w≤kh2, wherein kh1 is a preset first boundary condition parameter, kh2 is a preset second boundary condition parameter, w is the width of the first connected domain. It is determined that, the first connection domain satisfying w≥kh1 and the width w≤kh2, is the target connected domain; and the first connected domain that does not conform to w≥kh1 and w≤kh2, is not the target connected domain. The first connected domain which is not the target connected domain is deleted. As illustrated in FIG. 6, the first connected domains that are not the target connected domains are deleted.

In some embodiment, the first boundary condition parameter kh1 and the second boundary condition parameter kh2 may be determined as follows: if a flashing period of the flicking light source is T, a duty cycle of the modulated signal of the flicking light source is 1, an exposure time of row or column of the rolling shutter image sensor is t, then the first boundary condition parameter is kh1=(Φ*T)/(2t), the second boundary condition parameter is kh2=K*(Φ*T)/(2t), wherein K is a tuning parameter.

In the second embodiment, the raw image is processed to obtain a stripe pattern template. The target connected domain is identified according to the stripe pattern template, wherein a shape of the stripe pattern template is a patch formed by the stripe pattern in the raw image. Specifically, the raw image is filtered according to a filtering parameter to obtain a blurred image, wherein the filtering parameter is configured to merge the stripe pattern in the raw image into a patch. Then, the blurred image is binarized to obtain a binary blurred image. Thereafter, the connected domain is searched in the binary blurred image to obtain a plurality of second connected domains. Shapes of the plurality of second connected domains are identified, and the second connected domains closest to the stripe pattern formed by the predetermined flashing light source are defined as the stripe pattern template. After the process mentioned above, the second connected domains include the second connected domains correspond to the patch formed by the stripe pattern, the second connected domains correspond to the light spot formed by the incandescent lamps, and the second connected domains correspond to the light spot formed by the fluorescent lamps. A stripe pattern corresponds to a second connected domain. A light spot formed by an incandescent lamp corresponds to a second connected domain. A light spot formed by a fluorescent lamp corresponds to a second connected domain. And since the shapes of the second connected domains correspond to the patch formed by the stripe pattern, the second connected domains correspond to the light spot formed by the incandescent lamps, and the second connected domains correspond to the light spot formed by the fluorescent lamps are different from each other. The shape of the plurality of second connected domains can be identified, and the second connected domains closest to the stripe pattern formed by the predetermined flashing light source are selected as the stripe pattern template. After that, a set of coordinates of the pixels in the stripe pattern template are found. If it is judged that the coordinates of all pixels of the first connected domain are included in the set of the coordinates of the pixels in the stripe pattern template, it can be determined that the first connected domain is the target connected domain, and vice versa, it can be determined that the first connected domain is not the target connected domain. Judging each first connected domain as above, all the target connected domains corresponding to the stripe patterns may be found out.

Figure 7:
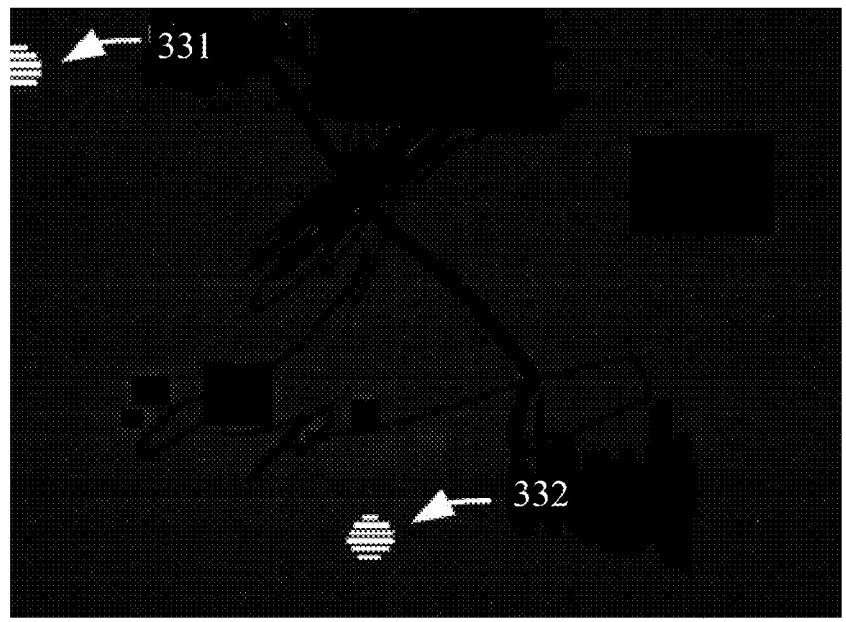
FIG. 7 illustrates an image obtained after the step 450 is performed in a method for determining the effectiveness of a stripe set, according to embodiments of the present disclosure.

In some embodiments, if the raw image includes a plurality of stripe patterns formed by a plurality of flashing light sources, the searched target connected domains will be classified to obtain a plurality of stripe sets. Specifically, initial stripe sets are determined, according to the condition that the target connected domain constitutes a stripe set, and the remained target connected domains that are not classified into any initial stripe set, are selected. Wherein, the condition of the target connected domain to constitute a stripe set may include: selecting a target connected domain not classified into any one of the stripe sets randomly, grouping the selected target connected domain into a stripe set to obtain the initial stripe set. Then, a jth target connected domain is selected from the target connected domains that are not classified into any initial stripe set, wherein j is a positive integer. A circle is drawn, with the center of mass of the jth target connected domain as the center of the circle and the length of the jth target connected domain as the diameter. Judging whether the circle intersects any one of the target connected domains in the initial stripe set. If intersecting, the jth target connected domain is classified into the corresponding initial stripe set whose target connected domains intersect the circle. After each of the remained target connected domains that are not classified into any one of the initial stripe sets being judged as mentioned above, the initial stripe set is updated to the stripe set. After the stripe set is determined, the image is shown in FIG. 7.

In some embodiments, if the number of the target connected domains is too small or the length of the longest target connected domain is too short, the stripe set thereof may be a failing stripe set. In order to improve the accuracy of searching the stripe set, the following judgment may be performed thereafter to remove the failing stripe set. Specifically, judging whether the stripe set satisfies the following conditions: the number of the target connected domains in the stripe set is greater than a number threshold; and a length of the longest target connected domain of the stripe set is greater than a length threshold. If one of the conditions is not satisfied, the stripe set is deleted. If both conditions are satisfied, the stripe set is retained.

In some embodiments, the center of the stripe pattern based on the target connected domains of the stripe set is calculated by: calculating an average of the coordinate values of the centers of the target connected domains in the stripe to obtain the coordinate value of the center of the stripe pattern, or calculating an average of the coordinate values of all pixels of the target connected domains of the stripe set to obtain the coordinate value of the center of the stripe pattern, or the like.

In one exemplary embodiment, the average of the coordinate values of the centers of the target connected domains of the stripe set is calculated according to the formula (1) to obtain the center ($u_0$, $v_0$) of the stripe pattern:

$$(u_0, v_0) = \left( \frac{\sum_{i=1}^{L_i} \left( u_{min}^i + \frac{W_i}{2} \right)}{L_i}, \frac{\sum_{i=1}^{L_i} \left( v_{min}^i + \frac{H_i}{2} \right)}{L_i} \right) \quad (1)$$

wherein i is the sequence number of the target connected domain of the stripe set, $L_i$ is the number of target connected domains of the stripe set, $u_{min}^i$ is the minimum abscissa of the ith target connected domain, $v_{min}^i$ is the minimum ordinate of the ith target connected domain, $W_i$ is the width of the ith target connected domain, and $H_i$ is the length of the ith target connected domain.

In another exemplary embodiment, firstly, the average of the coordinate values of the centers of the target connected domains of the stripe set is calculated according to the formula (1) to obtain the center ($u_0$, $v_0$) of the stripe pattern:

$$(u_0, v_0) = \left( \frac{\sum_{i=1}^{L_i} \left( u_{min}^i + \frac{W_i}{2} \right)}{L_i}, \frac{\sum_{i=1}^{L_i} \left( v_{min}^i + \frac{H_i}{2} \right)}{L_i} \right) \quad (1)$$

wherein i is the sequence number of the target connected domain of the stripe set, $L_i$ is the number of target connected domains of the stripe set, $u_{min}^i$ is the minimum abscissa of the ith target connected domain, $v_{min}^i$ is the minimum ordinate of the ith target connected domain, $W_i$ is the width of the ith target connected domain, and $H_i$ is the length of the ith target connected domain. Then, a rectangular region Q is obtained, wherein the center of the rectangular region Q is the center ($u_0$, $v_0$) of the stripe pattern, and the width of the rectangular region Q is the width of the maximum connected area in the stripe set. Thereafter, the pixel values of the pixels in the rectangular region Q are filtered to obtain the filtered pixel values. And the filtering method may be Gaussian filtering, mean filtering and etc. In some specific embodiments, filtering can be done by the following method. The pixel values of the pixels in the rectangular region Q are filtered by a filter template according to the formula (2) to obtain the filtered pixel values.

$$Gray_{u_j,v_j} = \frac{\sum_{x=-\frac{n-1}{2}}^{\frac{n-1}{2}} \sum_{y=-\frac{n-1}{2}}^{\frac{n-1}{2}} \begin{cases} grav_{(u_{j+x},v_{j+y})} > kvalue & grav_{(u_{j+x},v_{j+y})} \\ grav_{(u_{j+x},v_{j+y})} \leq kvalue & 0 \end{cases}}{n*n} \quad (2)$$

Wherein n is the number of rows and columns of the filter template, $grav_{(u_{j+x},v_{j+y})}$ is the pixel value, and kvalue is the binarization threshold. At last, coordinate values of the center ($u_0$, $v_0$) of the stripe pattern is recalculated while the pixel value of the filtered pixel as the weight. In some embodiments, coordinate values of the center ($u_0$, $v_0$) of the stripe pattern can be recalculated according to the formula (3).

$$(u_0, v_0) = \frac{\sum_Q Gray_{u_j,v_j}(u_j, v_j)}{\sum_Q Gray_{u_j,v_j}} \quad (3)$$

Wherein, $(u_j, v_j)$ is the coordinate value of the pixel in the rectangular region Q, and $Gray_{u_j,v_j}$ is the pixel value after the pixel $(u_j, v_j)$ being filtered.

Figure 8:
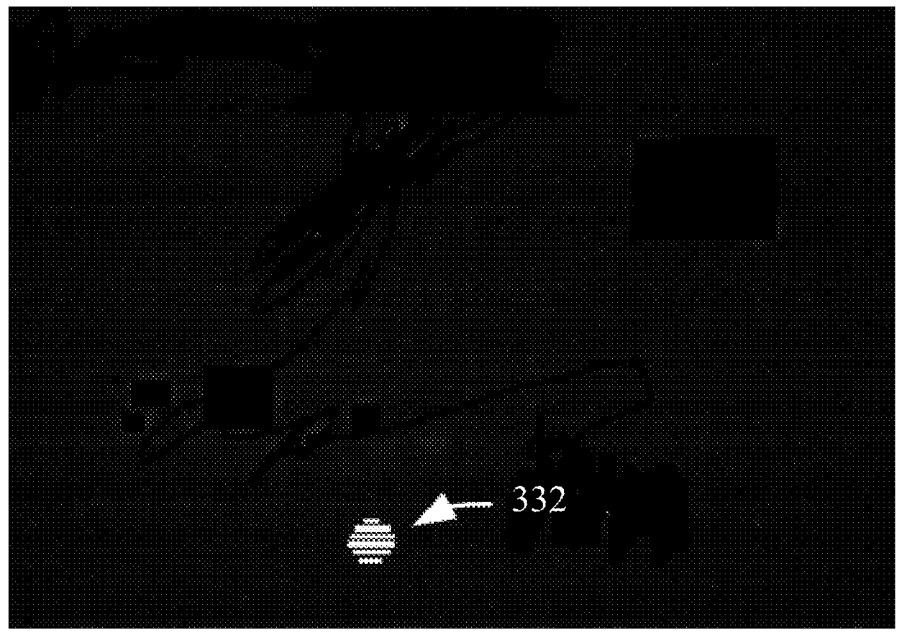
FIG. 8 illustrates an image obtained after the step 470 is performed in a method for determining the effectiveness of a stripe set, according to embodiments of the present disclosure.

In some embodiments, the following can be used to determine whether the stripe set is an effective stripe set. Specifically, whether the center $(u_0, v_0)$ of the stripe pattern satisfies at least one of the following is determined:

$$\begin{cases} u_0 - \frac{R}{2} < 0 \\ u_0 + \frac{R}{2} > kwide - 1 \\ v_0 - \frac{R}{2} < 0 \\ v_0 + \frac{R}{2} > kheight - 1 \end{cases}$$

Wherein R is the maximum width of the connected domain of the stripe set, is the width of the binary image, kwide is the height of the binary image. If at least one is satisfied, determining that the stripe set is an ineffective stripe set; if no one is satisfied, determining that the stripe set is an effective stripe set. After determining whether the stripes set is an effective stripe set, the resulting image is shown in FIG. 8.

Figure 9:
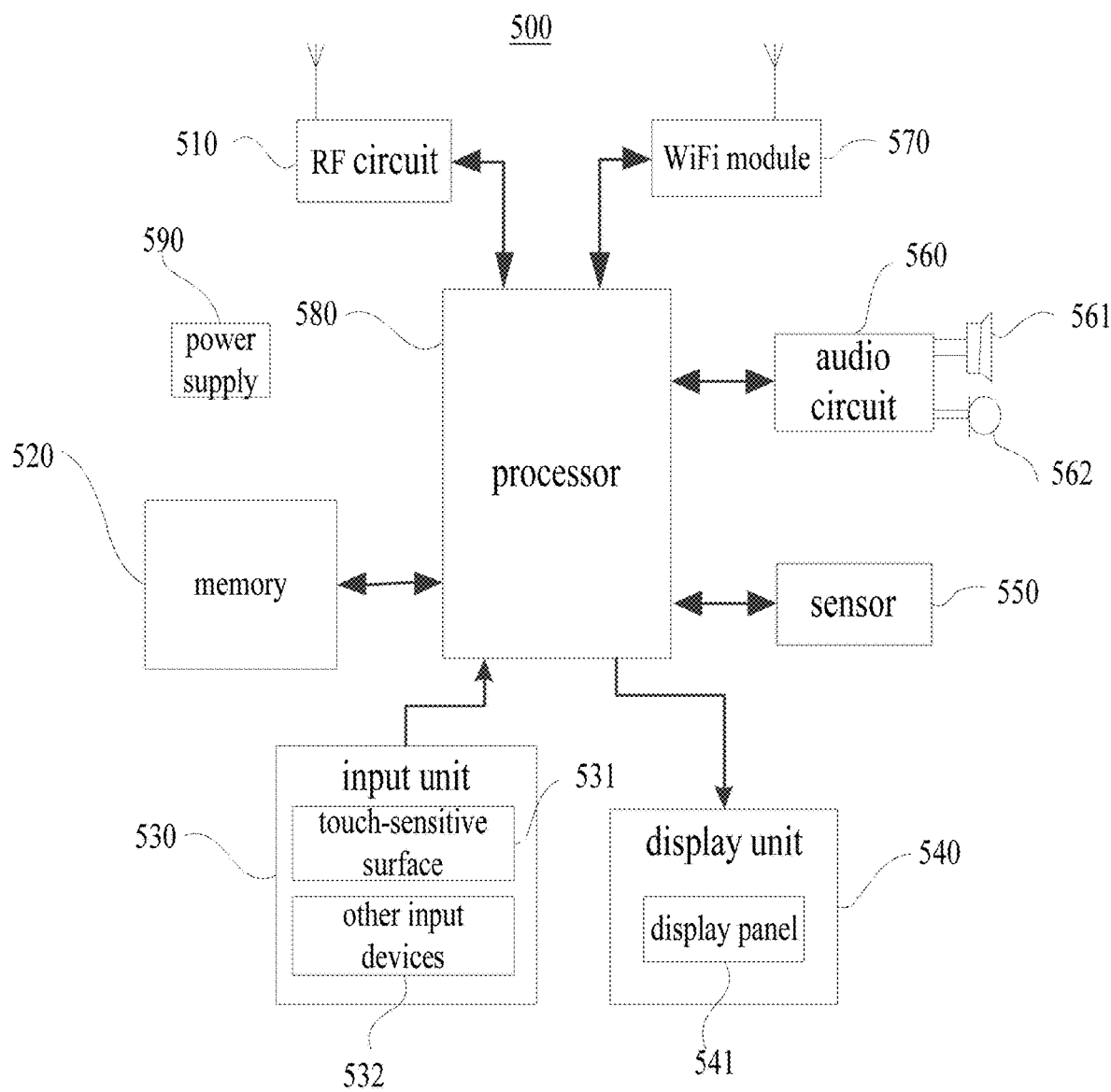
FIG. 9 illustrates a schematic structural view of a terminal, according to embodiments of the present disclosure.

As illustrated in FIG. 9, the present disclosure also provides a terminal. Specifically, the terminal 500 may include an RF (radio frequency) circuit 510, a memory 520 having one or more a computer readable medium, an input unit 530, a display unit 540, a sensor 550, an audio circuit 560, a WiFi (wireless fidelity) module 570, a processor 580 having one or more processing cores, and a power supply 590 and the like. It will be understood by those skilled in the art that the terminal structure shown in FIG. 9 does not constitute a limitation on the terminal and may include more or fewer components than illustrated, or to combine certain components, or different component arrangements. Wherein, The RF circuit 510 may be used to receive and transmit information, or to receive and transmit signals during a call. The downlink information of the base station is received and processed by one or more processors 580, and the uplink data is transmitted to the base station.

Typically, the RF circuit 510 may include, but is not limited to, an antenna, at least one amplifier, a tuner, one or more oscillators, a subscriber identity module (SIM) card, a transceiver, a coupler, an LNA (Low Noise Amplifier), a duplexer, etc. In addition, the RF circuit 510 may also communicate with the network and other devices by wireless communication. The wireless communication may use any communication standard or protocol including, but not limited to, GSM (Global System of Mobile communication), GPRS (General Packet Radio Service), CDMA (Code Division Multiple Access), WCDMA (Wideband Code Division Multiple Access) LTE (Long Term Evolution), e-mail, SMS (Short Messaging Service), and the like.

The memory 520 may be used to store software programs and modules. The processor 580 executes various functional applications and data processing by running software programs and modules stored in the memory 520. The memory 520 may mainly include a storage program area and a storage data area. Wherein the storage program area may store an operating system, at least one application program required for the function (such as voice playback, image playback and so on), and the like; the storage data area may store data (such as audio data, telephone book, etc.) created according to the use of the terminal 500, and the like. In addition, the memory 520 may include high-speed random access memory, and also may include non-volatile memory, such as at least one disk storage device, flash memory device, or other volatile solid state memory device. Accordingly, the memory 520 may also include a memory controller to provide access to the memory 520 by the processor 580 and the input unit 530.

The input unit 530 may be used to receive input digital or character information and to generate a signal input of keyboard, mouse, joystick, optical or trackball related to user settings and function control. The input unit 530 may include a touch-sensitive surface 531 and other input devices 532. The touch-sensitive surface 531, also referred to as a touch screen or a touchpad, can collect a touch operation on or near the user (such as a user operation on the touch-sensitive surface 531 or near the touch-sensitive surface 531 using a finger or stylus or any suitable object or attachment) and drives the corresponding connection device according to a preset program. Alternatively, the touch-sensitive surface 531 may include both a touch detection device and a touch controller. Wherein the touch detection device detects a touching position of the user and detects a signal from the touch operation to transmit a signal to the touch controller. The touch controller receives the touch information from the touch detection device and converts it into contact coordinates and sends it to the processor 580 and can receive the command sent by the processor 580 and execute it. In addition, the touch-sensitive surface 531 can be realized by various types such as resistive, capacitive, infrared, and surface acoustic waves. In addition to the touch-sensitive surface 531, the input unit 530 may also include other input devices 532. Other input devices 532 may include, but are not limited to, one or more of physical keyboards, function keys (such as volume control keys, switch keys, etc.), trackballs, mice, joysticks, and the like.

The display unit 540 may be used to display information entered by the user or information provided to the user and various graphical user interfaces of the terminal 500, which may be constructed from graphics, text, icons, video, and any combination thereof. The display unit 540 may include a display panel 541, and the display panel 541 may be configured in the form of LCD (Liquid Crystal Display), OLED (Organic Light-Emitting Diode), or the like. Further, the touch-sensitive surface 531 may cover the display panel 541. If the touch-sensitive surface 531 detects a touch operation on or near it, the touch-sensitive surface 531 sent the result to the processor 580 to determine the type of touch event. The processor 580 then provides a corresponding visual output on the display panel 541 according to the type of touch event. Although the touch-sensitive surface 531 and the display panel 541 are as two separate components in FIG. 9 to realize the input and input functions, but in some embodiments the touch-sensitive surface 531 may be integrated with the display panel 541 to achieve input and output function.

The terminal 500 may also include at least one sensor 550, such as a light sensor, a motion sensor, and other sensors. In particular, the light sensor may include an ambient light sensor and a proximity sensor, wherein the ambient light sensor may adjust the brightness of the display panel 541 in accordance with the shading of the ambient light, and the proximity sensor may turn off the display panel 541 and/or make the display panel 541 backlight when the terminal 500 is moved to the ear. As a kind of motion sensor, the gravitational acceleration sensor can detect the magnitude of the acceleration in all directions (usually three axes). When the gravity acceleration sensor is stationary, it can detect the size and direction of gravity, can be used to the application to identify the gesture of mobile phone gesture (such as vertical and horizontal screen switching, related games, magnetometer gesture calibration), vibration recognition related functions (such as pedometer, percussion) and so on. As for the terminal 500 can also be configured gyroscopes, barometers, hygrometers, thermometers, infrared sensors and other sensors, will not repeat them here.

An audio circuit 560, a speaker 561, and a microphone 562 may provide an audio interface between the user and the terminal 500. The audio circuit 560 may transmit the received electrical data converted by the received audio data to the speaker 561, and the speaker 561 converts the electrical signal into an audio signal output. On the other hand, the microphone 562 converts the captured sound signal into an electrical signal, the audio circuit 560 receives the electrical signal and converts it into audio data, outputs the audio data to the processor 580, the processor processes the audio data, the RF circuit 510 sends the processed audio data to, for example, another terminal, or outputs the audio data to the memory 520 for further processing. The audio circuit 560 may also include an ear plug jack to provide communication between the peripheral headset and the terminal 500.

WiFi is a short distance wireless transmission technology. Terminal 500 through the WiFi module 570 can help users send and receive e-mail, browse the web and access streaming media. WiFi provides users with wireless broadband Internet access. Although FIG. 9 shows the WiFi module 570, the WiFi module 570 does not belong to the necessary configuration of the terminal 500 and can be omitted as needed without departing from the spirit of the present disclosure.

The processor 580 is a control center of the terminal 500, and various parts of the entire phone are connected by various interfaces and lines. The processor 580 performs various functions and processing data of the terminal 500 by running or executing software programs and/or modules stored in the memory 520, and invoking the data stored in the memory 520, to monitor the phone overall. Optionally, the processor 580 may include one or more processing cores. Preferably, the processor 580 may integrate an application processor and a modem processor. Among them, the application processor mainly handles the operating system, the user interface and the application program and so on. The modem processor mainly handles wireless communications. It will be appreciated that the above-described modem processor may not be integrated into the processor 580.

The terminal 500 also includes a power supply 590 (e.g., a battery) that supplies power to the various components. Preferably, the power supply may be logically connected to the processor 580 through a power management system to enable functions such as managing charging, discharging, and power management through the power management system. The power supply 590 may also include any one or more components such as DC or AC power, a recharging system, a power failure detection circuit, a power converter or an inverter, a power status indicator, and the like.

Although not shown, the terminal 500 may include a camera, a Bluetooth module and so on, and will not be described again. Specifically, in the embodiment, the display unit of the terminal is a touch screen display. The terminal also includes a memory, and one or more programs. Wherein one or more of the programs are stored in memory and configured to be executed by one or more processors. The one or more programs contain instructions for performing the following operations.

A plurality of first connected domains are obtained in the binary image. A target connected domain is selected from the plurality of first connected domains. The stripe set based on the target connected domain is determined to determine a stripe pattern. A center of the stripe pattern is calculated according to the target connected domain of the stripe set. Whether the stripe set is an effective stripe set is determined based on the center of the stripe pattern.

Optionally, before obtaining a plurality of first connected domains in the binary image, the method further includes: the raw image captured by the rolling shutter image sensor is received. Wherein the raw image includes the stripe pattern formed by a flashing light source. The raw image is binarized according to a binarization threshold to obtain a binary image.

Optionally, the selecting the plurality of target connected domains from the plurality of first connected domains includes: determining a width of each first connected domain, comparing each width with a preset width, and according to the comparison result, determining eligible first connected domains as the target connected domains.

Optionally, the comparing each width with a preset width, determining eligible first connected domains as the target connected domains, based on the comparing result includes: according to the rolling shutter image sensor imaging plane, the direction of extension of the preset stripe image is taken as the x-axis, and the y-axis is taken as perpendicular to the x-axis. All the pixels of the plurality of first connected domains are traversed to obtain a maximum column coordinate y1 and a minimum column coordinate y2 of all the pixels in the plurality of first connected domains. Determining the width of each first connected domain as follows: the maximum column coordinate y1 in the pixel minus the minimum column coordinate y2 in the pixel. Judging whether or not the width of each first connected domain is met: $kh1 \leq w \leq kh2$, where $kh1$ is a preset first boundary condition parameter, $kh2$ is a preset second boundary condition parameter, $w$ is the width of the first connected domain. The first connected domain which meets $w \geq kh1$ and $w \leq kh2$, is determined as the target connected domain.

Optionally, further including the step of deleting the first connected domain with the width not met: $kh1 \leq w \leq kh2$ from the plurality of first connected domains.

Optionally, after the receiving the raw image in one frame obtained by a rolling shutter image sensor, and before selecting the target connected domain, includes: the raw image is processed to obtain a stripe pattern template. The target connected domain is identified according to the stripe pattern template, wherein the shape of the stripe pattern template is a patch formed by the stripe pattern in the raw image.

Optionally, the processing the raw image to obtain the stripe pattern template includes: the raw image is filtered according to a filtering parameter to obtain a blurred image, wherein the filtering parameter is configured to merge the stripe pattern in the raw image into patch. The blurred image is binarized to obtain a binary blurred image. The connected domain is searched for the binary blurred image to obtain a plurality of second connected domains. Shapes of the plurality of second connected domains is identified, and the second connected domains closest to the stripe pattern formed by the predetermined flashing light source are defined as the stripe pattern template.

Optionally, identifying the target connected domain based on the stripe pattern template includes: judging whether or not the coordinates of pixels of the first connected domain are included in a set of coordinates of the pixels in the stripe pattern template. If the coordinates of pixels of the first connected domain are included in a set of coordinates of the pixels of the stripe pattern template, the first connected domain is determined as the target connected domain.

Optionally, the raw image includes a plurality of stripe patterns formed by a plurality of flashing light sources, and determining the stripe set based on the target connected domain includes: the target connected domains is classified to obtain a plurality of stripe sets.

Optionally, the classifying the target connected domains to obtain a plurality of stripe sets includes: an initial stripe set is determined according to the condition that the target connected domain constitutes a stripe set, and the target connected domain that is not classified as any initial stripe set is selected. The jth target connected domain is selected from the target connected domain that is not classified as any initial stripe set, wherein j is a positive integer. A circle is drawn with the center of mass of the jth target connected domain as the center of the circle and the length of the jth target connected domain as the diameter. Judging whether any one of the target connected regions in the initial stripe set intersects the circle. If intersecting, the jth target connected region is classified into the corresponding initial stripe set to obtain the stripe set.

Optionally, after classifying the target connected domains to obtain a plurality of stripe sets further includes: judging whether or not the stripe set satisfies the following conditions. A number of target connected domains in the set stripe set is greater than a number threshold; and a length of the longest target connected domain of the stripe set is greater than a length threshold. If one of the conditions is not satisfied, the stripe set is deleted.

Optionally, calculating the center of the stripe pattern based on the target connected domain of the stripe set includes: the average of the coordinate values of the centers of the target connected domains of the stripe set is calculated to obtain the coordinate value of the center of the stripe pattern Alternatively, calculating the average of the coordinate values of the centers of the target connected domains of the stripe set to obtain the coordinate value of the center of the stripe pattern specifically includes:

an average of the coordinate values of the centers of the target connected domains of the stripe set is calculated according to the formula (1) to obtain the center $(u_0, v_0)$ of the stripe pattern:

$$(u_0, v_0) = \left( \frac{\sum_{i=1}^{L_i} \left( u_{min}^i + \frac{W_i}{2} \right)}{L_i}, \frac{\sum_{i=1}^{L_i} \left( v_{min}^i + \frac{H_i}{2} \right)}{L_i} \right) \quad (1)$$

Wherein i is the sequence number of the target connected domain of the stripe set, $L_i$ is the number of target connected domains of the stripe set, $u_{min}^i$ is the minimum abscissa of the ith target connected domain, $v_{min}^i$ is the minimum ordinate of the ith target connected domain, $W_i$ is the width of the ith target connected domain, and $H_i$ is the length of the ith target connected domain.

Optionally, after calculating the average of the coordinate values of the centers of the target connected domains of the stripe set, and before determining whether the stripe set is an effective stripe set based on the center of the stripe pattern, the method further includes: the pixel values of the pixels in the rectangular region Q are filtered to obtain the filtered pixel values. Wherein the center of the rectangular region Q is the center $(u_0, v_0)$ of the stripe pattern, and the width of the rectangular region Q is the width of the maximum connected area in the stripe set. A coordinate value of the center $(u_0, v_0)$ of the stripe pattern is recalculated while the pixel value of the filtered pixel as the weight.

Optionally, filtering the pixel values of the pixels in the rectangular region Q to obtain the filtered pixel values specifically includes: the pixel values of the pixels in the rectangular region Q are filtered by filter template, according to the formula (2) to obtain the filtered pixel values $Gray_{u_j,v_j}$.

$$Gray_{u_j,v_j} = \frac{\sum_{x=-\frac{n-1}{2}}^{\frac{n-1}{2}} \sum_{y=-\frac{n-1}{2}}^{\frac{n-1}{2}} \begin{cases} grav_{(u_{j+x},v_{j+y})} > kvalue & grav_{(u_{j+x},v_{j+y})} \\ grav_{(u_{j+x},v_{j+y})} \le kvalue & 0 \end{cases}}{n*n} \quad (2)$$

Wherein n is the number of rows and columns of the filter template, $grav_{(u_{j+x},v_{j+y})}$ is the pixel value, and kvalue is the binarization threshold.

Optionally, recalculating the coordinate value of the center $(u_0, v_0)$ of the stripe pattern with the pixel value of the filtered pixel as the weight specifically includes: a coordinate value of the center $(u_0, v_0)$ of the stripe pattern can be recalculated according to the formula (3).

$$(u_0, v_0) = \frac{\sum_Q Gray_{u_j,v_j}(u_j, v_j)}{\sum_Q Gray_{u_j,v_j}} \quad (3)$$

Wherein, $(u_j, v_j)$ is the coordinate value of the pixel in the rectangular region Q, and $Gray_{u_j,v_j}$ is the pixel value after the pixel $(u_j, v_j)$ is filtered.

Optionally, determining whether the stripe set is an effective stripe set based on the center of the stripe pattern includes:

determining whether or not the center $(u_0, v_0)$ of the stripe pattern satisfies at least one of the following:

$$\begin{cases} u_0 - \frac{R}{2} < 0 \\ u_0 + \frac{R}{2} > kwide - 1 \\ v_0 - \frac{R}{2} < 0 \\ v_0 + \frac{R}{2} > kheight - 1 \end{cases}$$

Wherein R is the maximum width of the connected domain of the stripe set, kwide is the width of the binary image, kheight is the height of the binary image. If at least one is satisfied, determining that the stripe set is an ineffective stripe set; if no one is satisfied, determining that the stripe set is an effective stripe set.

To further optimize the motion tracking system, the present disclosure also provides another motion tracking system. The difference from the motion tracking system shown in FIG. 1 is that both the rolling shutter image sensor and the image processing device are integrated in the terminal. Wherein, the terminal can be smart phones, laptops, tablet computers, driving recorder, video recorders, projectors, and so on.

The embodiment of the present disclosure also provides an image processing system. The difference from the motion tracking system shown in FIG. 1 is that the image processing system includes only a rolling shutter image sensor and an image processing device, and does not include a controller.

The embodiments of the present disclosure also provide a stripe pattern search device including a unit capable of implementing the method shown in FIG. 4, specifically referring to FIG. 4 and the related description, which will not be described here.

The nature of the technical solution of the present application, the part contributing to the prior art, or all or part of the technical solution may be embodied in the form of a software product. The computer software product is stored in a storage medium and includes instructions for causing a computer device (which may be a personal computer, a server, or a network device, etc.) or a processor to perform all or part steps of the method described in each of the embodiments of the present application. The aforementioned storage medium includes a variety of media such as a USB disk, a mobile hard disk, a read-only memory (ROM), a random access memory (RAM), a magnetic disk, or an optical disk, which can store program code.

What is claimed is:

1. A method for determining effectiveness of a stripe set, comprising:
    binarizing a raw image to obtain a binary image, wherein the raw image comprises a stripe pattern formed by a flashing light source and the stripe pattern comprises a plurality of stripes;
    obtaining a plurality of first connected domains in the binary image, wherein the plurality of first connected domains each correspond to pixels connected to each other and having a pixel value equal to a first threshold value;
    selecting a plurality of target connected domains from the plurality of first connected domains, wherein each of the plurality of target connected domains corresponds to one of the plurality of stripes in the stripe pattern;
    determining a set of the target connected domains corresponding to the stripe pattern as the stripe set, thereby to determine the stripe pattern;
    calculating a center $(u_0, v_0)$ of the stripe pattern based on the stripe set; and
    determining whether the stripe set is an effective stripe set based on the center $(u_0, v_0)$ of the stripe pattern, comprising:
        judging whether the center $(u_0, v_0)$ of the stripe pattern satisfies at least one of the following:

$$\begin{cases} u_0 - \dfrac{R}{2} < 0 \\ u_0 + \dfrac{R}{2} > kwide - 1 \\ v_0 - \dfrac{R}{2} < 0 \\ v_0 + \dfrac{R}{2} > kheight - 1 \end{cases}$$

wherein $u_0$ and $v_0$ are coordinate values of the center of the stripe pattern, R is the maximum width of the target connected domain of the stripe set, kwide is the width of the binary image, kheight is the height of the binary image;
        if at least one is satisfied, determining that the stripe set is an ineffective stripe set; and
        if none are satisfied, determining that the stripe set is an effective stripe set.

2. The method as claimed in claim 1, wherein before the obtaining the plurality of first connected domains in the binary image, the method further comprises:
    receiving the raw image, wherein the raw image is obtained by a rolling shutter image sensor.

3. The method as claimed in claim 1, wherein the selecting the plurality of target connected domains from the plurality of first connected domains comprises:
    determining a width of each first connected domain;
    comparing each width with a preset width; and
    determining eligible first connected domains from the plurality of first connected domains as the target connected domains, based on the comparing result.

4. The method as claimed in claim 3, wherein the comparing each width with a preset width and determining eligible first connected domains from the plurality of first connected domains comprises:
    taking x-axis in the direction of extension of a preset stripe image and y-axis perpendicular to the x-axis, based on an imaging surface of the rolling shutter image sensor;
    traversing all pixels of the plurality of first connected domains to obtain a maximum column coordinate y1 and a minimum column coordinate y2 of each of the pixels in the plurality of first connected domains;
    determining the width w of each first connected domain as follows: the maximum column coordinate y1 in the pixel minus the minimum column coordinate y2 in the pixel;
    judging whether the width w of each first connected domain meets the expression kh1≤w≤kh2, wherein kh1 is a preset first boundary condition parameter and kh2 is a preset second boundary condition parameter; and
    determining the first connected domain whose width meets the expression as the target connected domain.

5. The method as claimed in claim 4, further comprising:
    deleting the first connected domain whose width fails to meet the expression, from the plurality of first connected domains.

6. The method as claimed in claim 2, wherein
    binarizing the raw image comprises:
    filtering and binarizing the raw image to obtain a binary blurred image, which comprises a plurality of second connected domains, one of the second connected domains closest to the stripe pattern formed by a predetermined flashing light source is defined as a stripe pattern template; and
    wherein, after binarizing the raw image and before selecting the plurality of target connected domains, the method further comprises:
    identifying the target connected domains based on the stripe pattern template.

7. The method as claimed in claim 2, wherein after receiving the raw image and before binarizing the raw image, the method further comprises:

filtering the raw image according to a filtering parameter to obtain a blurred image, wherein the filtering parameter is configured to merge the stripe pattern in the raw image;
wherein binarizing the raw image to obtain the binary image comprises:
binarizing the blurred image to obtain a binary blurred image;
wherein, after binarizing the raw image and before selecting the plurality of target connected domains, the method further comprises:
searching the binary blurred image to obtain a plurality of second connected domains;
identifying shapes of the plurality of second connected domains;
defining the second connected domain closest to the stripe pattern formed by a predetermined flashing light source, as a stripe pattern template; and
identifying the plurality of target connected domains from the plurality of first connected domains, based on the stripe pattern template.

8. The method as claimed in claim 7, wherein the identifying the target connected domains from the plurality of first connected domains, based on the stripe pattern template comprises:
judging whether the coordinates of pixels of the first connected domain are included in a set of coordinates of the pixels in the stripe pattern template;
if so, determining the first connected domain as the target connected domain.

9. The method as claimed in claim 1, wherein the raw image comprises a plurality of stripe patterns formed by a plurality of flashing light sources, the determining the set of the target connected domains corresponding to the stripe pattern as the stripe set comprises:
classifying the plurality of target connected domains to obtain a plurality of stripe sets.

10. The method as claimed in claim 9, wherein the classifying the plurality of target connected domains to obtain the plurality of stripe sets comprises:
determining a plurality of initial stripe sets each including more than one of the target connected domains, wherein there are remaining target connected domains that fail to be classified into any of the plurality of initial stripe sets;
selecting a jth target connected domain from the remaining target connected domains, wherein j is a positive integer;
drawing a circle, with the center of mass of the jth target connected domain as the center and the length of the jth target connected domain as the diameter;
judging whether the circle intersects any one of the target connected regions included in the plurality of initial stripe sets; and
classifying the jth target connected region into the corresponding initial stripe set whose target connected regions intersect the circle, and updating the initial stripe sets to a stripe set.

11. The method as claimed in claim 9, wherein, after the classifying the plurality of target connected domains to obtain the plurality of stripe sets, the method further comprises:
judging whether each of the plurality of stripe sets satisfies the following conditions:
the number of the target connected domains in the stripe set is greater than a number threshold; and a length of the longest target connected domain of the stripe set is greater than a length threshold;
deleting the stripe set which fails to satisfy both of the conditions, from the plurality of stripe sets.

12. The method as claimed in claim 1, wherein the calculating the center of the stripe pattern based on the stripe set comprises:
calculating an average of the coordinate values of the centers of the target connected domains of the stripe set, to obtain the coordinate values of the center of the stripe pattern.

13. The method as claimed in claim 12, wherein the calculating the average of the coordinate values of the centers of the target connected domains of the stripe set, to obtain the coordinate value of the center of the stripe pattern comprises:
calculating an average of the coordinate values of the centers of the target connected domains of the stripe set according to the formula to obtain the center $(u_0, v_0)$ of the stripe pattern:

$$(u_0, v_0) = \left( \frac{\sum_{i=1}^{L_i} \left(u_{min}^i + \frac{W_i}{2}\right)}{L_i}, \frac{\sum_{i=1}^{L_i} \left(v_{min}^i + \frac{H_i}{2}\right)}{L_i} \right)$$

wherein i is the sequence number of the target connected domain of the stripe set, $L_i$ is the number of target connected domains of the stripe set, $u_{min}^i$ is the minimum abscissa of the ith target connected domain, $v_{min}^i$ is the minimum ordinate of the ith target connected domain, $W_i$ is the width of the ith target connected domain, and $H_i$ is the length of the ith target connected domain.

14. The method as claimed in claim 13, wherein after the calculating the average of the coordinate values of the centers of the target connected domains of the stripe set, and before the determining whether the stripe set is an effective stripe set based on the center of the stripe pattern, the method further comprises:
filtering the pixel values of the pixels in a rectangular region Q to obtain the filtered pixel values, wherein the center of the rectangular region Q is the center $(u_0, v_0)$ of the stripe pattern, and the width of the rectangular region Q is the width of the maximum connected domain in the stripe set; and
recalculating coordinate values of the center $(u_0, v_0)$ of the stripe pattern, with the pixel value of the filtered pixel as the weight.

15. The method as claimed in claim 14, wherein the filtering the pixel values of the pixels in the rectangular region Q to obtain the filtered pixel values comprises:
filtering the pixel values of the pixels in the rectangular region Q by a filter template according to the formula, to obtain the filtered pixel value $Gray_{u_j, v_j}$:

$$Gray_{u_j, v_j} = \frac{\sum_{x=-\frac{n-1}{2}}^{\frac{n-1}{2}} \sum_{y=-\frac{n-1}{2}}^{\frac{n-1}{2}} \begin{cases} grav_{(u_{j+x}, v_{j+y})} > kvalue & grav_{(u_{j+x}, v_{j+y})} \\ grav_{(u_{j+x}, v_{j+y})} \leq kvalue & 0 \end{cases}}{n * n}$$

wherein n is the number of rows and columns of the filter template, $grav_{(u_{j+x}, u_{j+y})}$ is the pixel value, and kvalue is the binarization threshold.

16. The method as claimed in claim 14, wherein recalculating the coordinate values of the center ($u_0$, $v_0$) of the stripe pattern with the pixel value of the filtered pixel as the weight comprises:

recalculating coordinate values of the center ($u_0$, $v_0$) of the stripe pattern according to the formula:

$$(u_0, v_0) = \frac{\sum_Q Gray_{u_j, v_j}(u_j, v_j)}{\sum_Q Gray_{u_j, v_j}}$$

wherein ($\mu_j$, $v_j$) are coordinate values of the pixel in the rectangular region Q, and $Gray_{u_j, v_j}$ is the pixel value after the pixel ($\mu_j$, $v_j$) being filtered.

17. A terminal, comprising a rolling shutter image sensor, a memory, and a processor coupled to the rolling shutter image sensor and the memory, respectively; wherein the memory is configured to store images captured by the rolling shutter image sensor and a plurality of instructions; the processor is configured to execute the plurality of instructions; when the processor executing the plurality of instructions, a method for determining effectiveness of a stripe set is performed, wherein the method comprises:

binarizing a raw image to obtain a binary image, wherein the raw image is captured by the rolling shutter image sensor and comprises a stripe pattern formed by a flashing light source, and the stripe pattern comprises a plurality of stripes;

obtaining a plurality of first connected domains in the binary image, wherein the plurality of first connected domains each correspond to pixels connected to each other and having a pixel value equal to a first threshold value;

selecting a plurality of target connected domains from the plurality of first connected domains, comprising: determining a width of each of the plurality of first connected domains; comparing each width with a preset width; and determining eligible first connected domains as the target connected domains, based on the comparing result, wherein each of the plurality of target connected domains corresponds to one stripe of the stripe pattern;

determining a set of the target connected domains corresponding to the stripe pattern as the stripe set, thereby to determine the stripe pattern;

calculating a center ($u_0$, $v_0$) of the stripe pattern; and determining whether the stripe set is an effective stripe set based on the center ($u_0$, $v_0$) of the stripe pattern, comprising:

judging whether the center ($u_0$, $v_0$) of the stripe pattern satisfies at least one of the following:

$$\begin{cases} u_0 - \frac{R}{2} < 0 \\ u_0 + \frac{R}{2} > kwide - 1 \\ v_0 - \frac{R}{2} < 0 \\ v_0 + \frac{R}{2} > kheight - 1 \end{cases}$$

wherein $\mu_0$ and $v_0$ are coordinate values of the center of the stripe pattern, R is the maximum width of the target connected domain of the stripe set, kwide is the width of the binary image, kheight is the height of the binary image;

if at least one is satisfied, determining that the stripe set is an ineffective stripe set;

if none are satisfied, determining that the stripe set is an effective stripe set.

18. An image processing device, comprising a memory, and a processor coupled to a rolling shutter image sensor and the memory, respectively; wherein the memory is configured to store images obtained by the rolling shutter image sensor and a plurality of instructions; the processor is configured to execute the plurality of instructions; when the processor executing the plurality of instructions, a method for determining effectiveness of a stripe set is performed, wherein the method comprises:

binarizing a stored image to obtain a binary image, wherein the stored image is captured by the rolling shutter image sensor and comprises a stripe pattern formed by a flashing light source, the stripe pattern comprises a plurality of stripes;

obtaining a plurality of first connected domains in the binary image, wherein the plurality of first connected domains each correspond to pixels connected to each other and having a pixel value equal to a first threshold value;

selecting a plurality of target connected domains from the plurality of first connected domains, wherein each of the plurality of target connected domains corresponds to one of the plurality of stripes in the stripe pattern;

determining a set of the target connected domains corresponding to the stripe pattern as the stripe set, to determine the stripe pattern;

calculating a center ($u_0$, $v_0$) of the stripe pattern; and determining whether the stripe set is an effective stripe set based on the center ($u_0$, $v_0$) of the stripe pattern, comprising:

judging whether the center ($u_0$, $v_0$) of the stripe pattern satisfies at least one of the following:

$$\begin{cases} u_0 - \frac{R}{2} < 0 \\ u_0 + \frac{R}{2} > kwide - 1 \\ v_0 - \frac{R}{2} < 0 \\ v_0 + \frac{R}{2} > kheight - 1 \end{cases}$$

wherein $\mu_0$ to and $v_0$ are coordinate values of the center of the stripe pattern, R is the maximum width of the target connected domain of the stripe set, kwide is the width of the binary image, kheight is the height of the binary image;

if at least one is satisfied, determining that the stripe set is an ineffective stripe set;

if none are satisfied, determining that the stripe set is an effective stripe set.

19. The method as claimed in claim 4, comprising:

determining the first boundary condition parameter kh1 and the second boundary condition parameter kh2 as follows:

$$kh1 = (\Phi * T)/(2t), kh2 = K * (\Phi * T)/(2t);$$

wherein, T is a flashing period of a flicking light source, Φ is a duty cycle of the modulated signal of the flicking light source, t is an exposure time of the original image corresponding to the binarized image, K is a tuning parameter.

20. The terminal as claimed in claim 17, wherein, comparing each width with a preset width and determining eligible first connected domains as the target connected domains, comprises:
  taking x-axis in the direction of extension of a preset stripe image and y-axis perpendicular to the x-axis, based on an imaging surface of the rolling shutter image sensor;
  traversing all pixels of the plurality of first connected domains to obtain a maximum column coordinate y1 and a minimum column coordinate y2 of each of the pixels in the plurality of first connected domains;
  determining the width w of each first connected domain as follows: the maximum column coordinate y1 in the pixel minus the minimum column coordinate y2 in the pixel;
  judging whether the width w of each first connected domain meets the expression $kh1 \leq w \leq kh2$, wherein kh1 is a preset first boundary condition parameter and kh2 is a preset second boundary condition parameter; and
  determining the first connected domain whose width meets the expression as the target connected domain.

* * * * *